(12) United States Patent
    Ishizeki (10) Patent No.: US 11,518,216 B2
(45) Date of Patent: Dec. 6, 2022

(54) VEHICLE AIR CONDITIONING APPARATUS

(71) Applicant: SANDEN AUTOMOTIVE CLIMATE SYSTEMS CORPORATION, Isesaki (JP)

(72) Inventor: Tetsuya Ishizeki, Isesaki (JP)

(73) Assignee: SANDEN AUTOMOTIVE CLIMATE SYSTEMS CORPORATION, Isesaki (JP)

( * ) Notice: Subject to any disclaimer, the term of this patent is extended or adjusted under 35 U.S.C. 154(b) by 330 days.

(21) Appl. No.: 16/981,614

(22) PCT Filed: Mar. 12, 2019

(86) PCT No.: PCT/JP2019/009931
    § 371 (c)(1),
    (2) Date: Sep. 16, 2020

(87) PCT Pub. No.: WO2019/230118
    PCT Pub. Date: Dec. 5, 2019

(65) Prior Publication Data
    US 2021/0016627 A1    Jan. 21, 2021

(30) Foreign Application Priority Data

May 28, 2018 (JP) .............................. JP2018-101605

(51) Int. Cl.
    *B60H 1/14*     (2006.01)
    *B60H 1/32*     (2006.01)
    *B60H 1/00*     (2006.01)

(52) U.S. Cl.
    CPC ......... *B60H 1/143* (2013.01); *B60H 1/00278* (2013.01); *B60H 1/00328* (2013.01);
    (Continued)

(58) Field of Classification Search
    CPC ................ B60H 1/143; B60H 1/00278; B60H 1/00328; B60H 1/00342; B60H 1/00385; B60H 1/32284; B60H 2001/00307
    See application file for complete search history.

(56) References Cited

U.S. PATENT DOCUMENTS 9,592,717 B2 *  3/2017  Katoh ................... B60H 1/3213
    9,649,909 B2 *  5/2017  Enomoto .............. B60W 10/30
                         (Continued)

FOREIGN PATENT DOCUMENTS

JP    2006-519133 A    8/2006
    JP    2015-030279 A    2/2015
                         (Continued)

OTHER PUBLICATIONS

Japan Patent Office, International Search Report issued in International Application No. PCT/JP2019/009931, dated Apr. 23, 2019.

*Primary Examiner* — Ljiljana V. Ciric
(74) *Attorney, Agent, or Firm* — Baker Botts L.L.P.

(57) ABSTRACT

A vehicle air conditioning apparatus includes: a refrigerant circuit that adjusts a temperature or a humidity of air in a vehicle compartment, including a compressor, indoor heat exchangers, an outdoor heat exchanger, and expansion valves; a first heat medium circuit that allows a first heat medium absorbing heat released from a first heat releasing body to flow therethrough; a second heat medium circuit that allows a second heat medium absorbing heat released from a second heat releasing body to flow therethrough; a first heat medium heat releasing unit that performs a heat exchange between the refrigerant and the first heat medium to release the heat from the first heat medium to the refrigerant; and a second heat medium heat releasing unit that performs a heat exchange between the first heat medium
(Continued)

and the second heat medium to release the heat from the second heat medium to the first heat medium.

11 Claims, 5 Drawing Sheets

(52) U.S. Cl.
CPC ..... *B60H 1/00342* (2013.01); *B60H 1/00385* (2013.01); *B60H 1/32284* (2019.05); *B60H 2001/00307* (2013.01)

(56) References Cited

U.S. PATENT DOCUMENTS

| | | | | |
|---|---|---|---|---|
| 9,744,827 | B2* | 8/2017 | Nishikawa | B60H 1/32 |
| 9,797,641 | B2* | 10/2017 | Suzuki | F25B 47/022 |
| 9,873,307 | B2* | 1/2018 | Suzuki | F25B 40/02 |
| 9,878,595 | B2* | 1/2018 | Miyakoshi | B60H 1/00385 |
| 9,909,794 | B2* | 3/2018 | Suzuki | B60H 1/00921 |
| 10,040,337 | B2* | 8/2018 | Miyakoshi | B60H 1/3208 |
| 10,047,988 | B2* | 8/2018 | Miyakoshi | F25B 31/008 |
| 10,279,654 | B2* | 5/2019 | Miyakoshi | F25B 41/24 |
| 10,457,117 | B2* | 10/2019 | Enomoto | B60H 1/24 |
| 10,525,792 | B2* | 1/2020 | Suzuki | B60H 1/3229 |
| 10,525,794 | B2* | 1/2020 | Suzuki | B60H 1/00921 |
| 10,538,144 | B2* | 1/2020 | Suzuki | B60H 1/00921 |
| 10,562,375 | B2* | 2/2020 | Suzuki | B60H 1/321 |
| 10,647,178 | B2* | 5/2020 | Suzuki | F25B 41/00 |
| 10,899,198 | B2* | 1/2021 | Nishikawa | B60H 1/323 |
| 10,946,719 | B2* | 3/2021 | Suzuki | B60H 1/00385 |
| 11,021,044 | B2* | 6/2021 | Suzuki | B60H 1/321 |
| 11,065,934 | B2* | 7/2021 | Lee | H01M 10/6568 |
| 11,097,599 | B2* | 8/2021 | Miyakoshi | B60H 1/32 |
| 11,383,583 | B2* | 7/2022 | Kozasa | F28D 7/0083 |
| 2005/0039878 | A1 | 2/2005 | Meyer | F25B 29/003 62/324.1 |
| 2005/0138942 | A1* | 6/2005 | Grimm | B60H 1/32281 62/235.1 |
| 2006/0032623 | A1* | 2/2006 | Tsubone | F28D 20/00 165/202 |
| 2006/0137853 | A1 | 6/2006 | Haller et al. | |
| 2010/0281901 | A1* | 11/2010 | Kawase | B60H 1/32284 62/238.7 |
| 2011/0174000 | A1 | 7/2011 | Richter et al. | |
| 2011/0197611 | A1* | 8/2011 | Hall | B60H 1/32284 62/238.7 |
| 2013/0319029 | A1 | 12/2013 | Sekiya et al. | |
| 2014/0338376 | A1* | 11/2014 | Carpenter | B60L 50/51 62/115 |
| 2014/0374081 | A1* | 12/2014 | Kakehashi | B60H 1/00278 429/120 |
| 2016/0178253 | A1 | 6/2016 | Katoh et al. | |
| 2016/0201960 | A1* | 7/2016 | Miyakoshi | B60H 1/00385 62/154 |
| 2016/0318370 | A1 | 11/2016 | Rawlinson | |
| 2018/0072130 | A1 | 3/2018 | Kim | |
| 2019/0023100 | A1* | 1/2019 | Suzuki | F25B 6/02 |
| 2019/0061472 | A1* | 2/2019 | Shigeta | B60H 1/3228 |
| 2019/0353407 | A1* | 11/2019 | Miyakoshi | B60H 1/2225 |
| 2020/0122544 | A1* | 4/2020 | Ishizeki | B60H 1/00921 |
| 2020/0148024 | A1* | 5/2020 | Ishizeki | B60H 1/00385 |
| 2021/0016625 | A1* | 1/2021 | Lee | B60H 1/00278 |
| 2021/0016627 | A1* | 1/2021 | Ishizeki | B60H 1/00328 |
| 2021/0245577 | A1* | 8/2021 | Miyakoshi | F25B 41/24 |
| 2021/0268870 | A1* | 9/2021 | Dong | B60H 1/00278 |
| 2021/0291626 | A1* | 9/2021 | Makimoto | B60H 1/00278 |
| 2021/0300146 | A1* | 9/2021 | Ishizeki | B60H 1/3205 |
| 2021/0309070 | A1* | 10/2021 | Ishizeki | B60H 1/32011 |
| 2021/0387506 | A1* | 12/2021 | Miyoshi | B60H 1/004 |
| 2022/0032725 | A1* | 2/2022 | Miyakoshi | B60H 1/00792 |
| 2022/0032732 | A1* | 2/2022 | Makihara | B60H 1/00278 |
| 2022/0134842 | A1* | 5/2022 | Ishizeki | B60H 1/00278 165/202 |
| 2022/0274463 | A1* | 9/2022 | Koo | B60H 1/3205 |

FOREIGN PATENT DOCUMENTS

| | | |
|---|---|---|
| JP | 2018-035951 A | 3/2018 |
| JP | 2018-043741 A | 3/2018 |
| WO | 2012/114447 A1 | 8/2012 |
| WO | 2014/185150 A1 | 11/2014 |

* cited by examiner

VEHICLE AIR CONDITIONING APPARATUS

CROSS-REFERENCE TO RELATED APPLICATIONS

This application is a U.S. National Stage Patent Application under 35 U.S.C. § 371 of International Patent Application No. PCT/JP2019/009931, filed on Mar. 12, 2019, which claims the benefit of Japanese Patent Application No. 2018-101605, filed on May 28, 2018, the disclosures of each of which are incorporated herein by reference in their entirety.

TECHNICAL FIELD

The present invention relates to a vehicle air conditioning apparatus applicable to a vehicle equipped with a plurality of devices such as an electric motor for driving the vehicle and a battery for accumulating electric power to be supplied to the electric motor which release heat when used.

BACKGROUND ART

Conventionally, this sort of vehicle air conditioning apparatus includes a refrigerant circuit including a compressor, an indoor heat exchanger, an outdoor heat exchanger, and expansion valves, and is configured to cool, heat, and dehumidify a vehicle compartment by supplying the vehicle compartment with the air having been subjected to a heat exchange with the refrigerant in the indoor heat exchanger.

In addition, there has been known a vehicle equipped with this vehicle air conditioning apparatus, such as an electric car and a hybrid car, which includes a plurality of devices such as an electric motor for driving the car and a battery for accumulating electric power to be supplied to the electric motor which release heat when used.

Therefore, in the vehicle, the plurality of devices releasing heat are connected to a cooling water circuit to cool the devices by using the cooling water flowing through the cooling water circuit, and the cooling water used to cool the devices and having absorbed the heat from the devices is subjected to a heat exchange with a refrigerant flowing through a refrigerant circuit to release the heat (see, for example, Patent Literature 1).

CITATION LIST

Patent Literature

PTL1: Japanese Patent Application Laid-Open No. 2018-43741

SUMMARY OF INVENTION

Technical Problem

In the vehicle, the plurality of devices targeted for cooling have target cooling temperatures different from each other. In the vehicle, the plurality of devices with the target cooling temperatures different from each other are connected to one cooling water circuit, and therefore the control to make the temperatures of the plurality of devices targeted for cooling reach respective target cooling temperatures may be complicated.

It is therefore an object of the invention to provide a vehicle air conditioning apparatus capable of easily making the temperatures of a plurality of devices targeted for cooling reaches respective target cooling temperatures, when the plurality of devices have the target cooling temperatures different from each other.

Solution to Problem

To achieve the object, the vehicle air conditioning apparatus according to the invention includes: a refrigerant circuit configured to adjust a temperature or a humidity of air in a vehicle compartment and including a compressor, indoor heat exchangers configured to perform a heat exchange between air supplied to the vehicle compartment and a refrigerant, an outdoor heat exchanger, and expansion valves; a first heat medium circuit configured to allow a first heat medium absorbing heat released from a first heat releasing body to flow therethrough; a second heat medium circuit configured to allow a second heat medium absorbing heat released from a second heat releasing body to flow therethrough; a first heat medium heat releasing unit configured to perform a heat exchange between the refrigerant flowing through the refrigerant circuit and the first heat medium flowing through the first heat medium circuit to release the heat from the first heat medium to the refrigerant; and a second heat medium heat releasing unit configured to perform a heat exchange between the first heat medium flowing through the first heat medium circuit and the second heat medium flowing through the second heat medium circuit to release the heat from the second heat medium to the first heat medium.

By this means, the heat released from the first heat releasing body is absorbed into the refrigerant via the first heat medium, and the heat released from the second heat releasing body is absorbed into the refrigerant via the second heat medium and the first heat medium. Therefore, it is possible to keep the temperature of the second heat releasing body cooled by the second heat medium having been subjected to a heat exchange indirectly with the refrigerant via the first heat medium higher than the temperature of the first heat releasing body cooled by the first heat medium having been subjected to a heat exchange directly with the refrigerant.

Advantageous Effect

According to the invention, it is possible to keep the temperature of the second heat releasing body cooled by the second heat medium having been subjected to a heat exchange indirectly with the refrigerant via the first heat medium higher than the temperature of the first heat releasing body cooled by the first heat medium having been subjected to a heat exchange directly with the refrigerant. Therefore, the plurality of heat releasing bodies are connected to the first heat medium circuit or the second heat medium circuit depending on their target cooling temperatures, respectively. Consequently, it is possible to easily make the temperatures of the first heat releasing body and the second heat releasing body reach the respective target cooling temperatures without complicated controls.

DESCRIPTION OF EMBODIMENTS

FIGS. 1 to 5 illustrate an embodiment of the invention.

A vehicle air conditioning apparatus 1 according to the invention is applicable to a vehicle such as an electric car and a hybrid car, which can be driven by the driving force of an electric motor.

The vehicle includes an electric motor M as a second heat releasing body for driving the vehicle, and a battery B as a first heat releasing body that accumulates electric power supplied to the electric motor M for driving the vehicle. The electric motor M and the battery B have available temperature zones different from one another. In addition, each of the electric motor M and the battery B releases heat when used. Therefore, there is need to individually cool and heat the electric motor M and the battery B. It is preferable to use the electric motor M within a range of, for example, 30 degrees Celsius to 50 degrees Celsius, and to use the battery B within a range of, for example, 10 degrees Celsius to 30 degrees Celsius lower than the temperature range available for the electric motor M.

Figure 1:
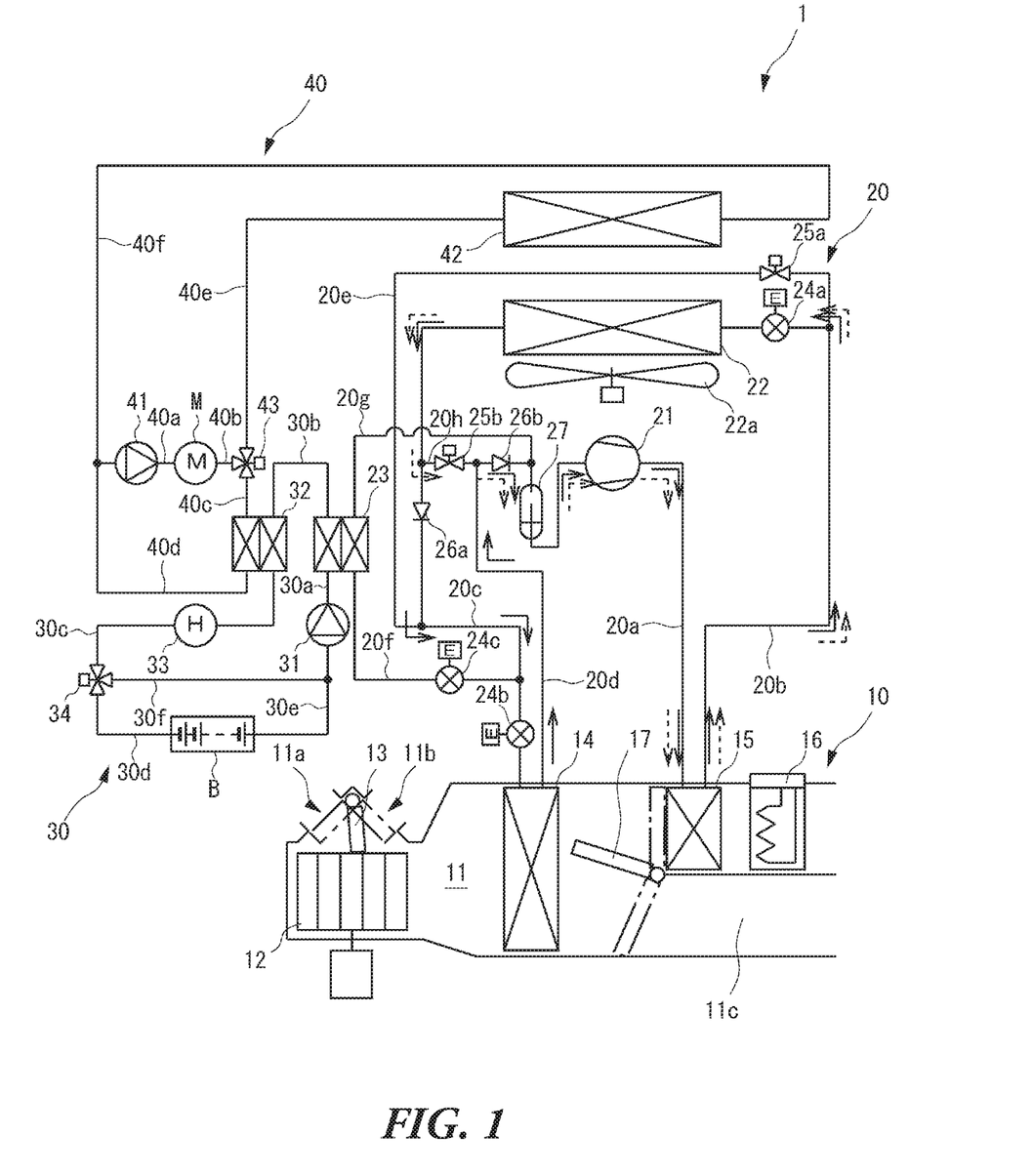
FIG. 1 schematically illustrates the configuration of a vehicle air conditioning apparatus according to an embodiment of the invention.

As illustrated in FIG. 1, the vehicle air conditioning apparatus 1 includes: an air conditioning unit 10 provided in the vehicle compartment of the vehicle; a refrigerant circuit 20 provided across the vehicle compartment and the outside of the vehicle compartment; a first heat medium circuit 30 configured to allow a first heat medium that absorbs the heat released from the battery B and heats the battery B to flow therethrough; and a second heat medium circuit 40 configured to allow a second heat medium that absorbs the heat released from the electric motor M and heats the electric motor M to flow therethrough.

The air conditioning unit 10 includes an air flow passage 11 that allows the air supplied to the vehicle compartment to flow therethrough. An outdoor air inlet 11a and an indoor air inlet 11b are provided in one end side of the air flow passage 11. The outdoor air inlet 11a is configured to allow the air outside the vehicle compartment to flow into the air flow passage 11, and the indoor air inlet 11b is configured to allow the air in the vehicle compartment to flow into the air flow passage 11. Meanwhile, a foot outlet, a vent outlet and a defroster outlet (not shown) are provided in the other end side of the air flow passage 11. The foot outlet is configured to allow the air flowing through the air flow passage 11 to blow to the feet of the passengers. The vent outlet is configured to allow the air flowing through the air flow passage 11 to blow to the upper bodies of the passengers. The defroster outlet is configured to allow the air flowing through the air flow passage 11 to blow to the surface of the front window in the vehicle compartment.

An indoor fan 12 such as a sirocco fan is provided in the one end side of the air flow passage 11 and configured to allow the air to flow through the air flow passage 11 from the one end side to the other end side.

Also, an inlet switching damper 13 is provided in the one end side of the air flow passage 11 and configured to be able to open one of the outdoor air inlet 11a and the indoor air inlet 11b and close the other. The inlet switching damper 13 can switch the mode of the inlets among: an outdoor air supply mode to close the indoor air inlet 11b and open the outdoor air inlet 11a; an indoor air circulating mode to close the outdoor air inlet 11a and open the indoor air inlet 11b; and an indoor and outdoor air suction mode to open both the outdoor air inlet 11a and the indoor air inlet 11b by disposing the inlet switching damper 13 between the outdoor air inlet 11a and the indoor air inlet 11b.

A heat absorbing unit 14 is provided downstream of the indoor fan 12 in the air flow direction of the air flow passage 11. The heat absorbing unit 14, as an indoor heat exchanger, is configured to cool and dehumidify the air flowing through the air flow passage 11. In addition, a heat releasing unit 15 is provided downstream of the heat absorbing unit 14 in the air flow direction of the air flow passage 11. The heat releasing unit 15, as an indoor heat exchanger, is configured to heat the air flowing through the air flow passage 11.

The heat releasing unit 15 is disposed in one side of the orthogonal direction of the air flow passage 11, and a heat releasing unit bypass flow passage 11c is formed in the other side of the orthogonal direction of the air flow passage 11 to bypass the heat releasing unit 15. An air heater 16 is provided downstream of the heat releasing unit 15 in the air flow direction of the air flow passage 11 and configured to heat the air to be supplied to the vehicle compartment.

An air mix damper 17 is provided in the air flow passage 11 between the heat absorbing unit 14 and the heat releasing unit 15, and configured to control the percentage of the air to be heated by the heat releasing unit 15, which has passed through the heat absorbing unit 14. The air mix damper 17 is provided upstream of the heat releasing unit 15 and the heat releasing unit bypass flow passage 11c in the air flow direction, and configured to close the upstream side of one of the heat releasing unit bypass flow passage 11c and the heat releasing unit 15 and open the other in the air flow direction, or open both the heat releasing unit bypass flow passage 11c and the heat releasing unit 15 to adjust the degree of opening of the upstream side of the heat releasing unit 15 in the air flow direction. The degree of opening of the air mix damper 17 is 0% when the upstream side of the heat releasing unit 15 in the air flow direction of the air flow passage 11 is closed and the heat releasing unit bypass flow passage 11c is open. On the other hand, the degree of opening of the air mix damper 17 is 100% when the upstream side of the heat releasing unit 15 in the air flow direction of the air flow passage 11 is open and the heat releasing unit bypass flow passage 11c is closed.

The refrigerant circuit 20 includes: the heat absorbing unit 14; the heat releasing unit 15; a compressor 21 configured to compress a refrigerant; the outdoor heat exchanger 22 configured to perform a heat exchange between the refrigerant and the air outside the vehicle compartment; a first heat medium heat exchanger 23 as a first heat medium heat releasing unit configured to perform a heat exchange between the refrigerant flowing through the refrigerant circuit 20 and the first heat medium flowing through the first heat medium circuit 30; first to third expansion valves 24a, 24b and 24c having degrees of opening which can be adjusted from full close to full open; first and second solenoid valves 25a and 25b configured to open and close the flow path of the refrigerant; first and second check valves 26a and 26b configured to control the flow direction of the refrigerant in the flow path of the refrigerant; and an accumulator 27 configured to separate between refrigerant vapor and refrigerant liquid to prevent the refrigerant liquid from being sucked into the compressor 21. These components are connected by, for example, an aluminum pipe or a copper pipe. As the refrigerant flowing through the refrigerant circuit 20, for example, R-134a may be used.

To be more specific, the input side of the heat releasing unit 15 into which the refrigerant flows is connected to the delivery side of the compressor 21 from which the refrigerant is discharged, thereby to form a refrigerant flow passage 20a. Meanwhile, the input side of the outdoor heat exchanger 22 into which the refrigerant flows is connected to the output side of the heat releasing unit 15 from which the refrigerant is discharged, thereby to form a refrigerant flow passage 20b. The first expansion valve 24a is provided in the refrigerant flow passage 20b. The input side of the heat absorbing unit 14 into which the refrigerant flows is connected to the output side of the outdoor heat exchanger 22 from which the refrigerant is discharged, thereby to form a refrigerant flow passage 20c. The first check valve 26a and the second expansion valve 24b are provided in the refrigerant flow passage 20c in the order from the outdoor heat exchanger 22 side. The suction side of the compressor 21 into which the refrigerant is sucked is connected to the output side of the heat absorbing unit 14 from which the refrigerant is discharged, thereby to form a refrigerant flow passage 20d. The second check valve 26b and an accumulator 27 are provided in the refrigerant flow passage 20d in the order from the heat absorbing unit 14 side. A refrigerant flow passage 20e is formed between the heat releasing unit 15 and the first expansion valve 24a in the refrigerant flow passage 20b by bypassing the outdoor heat exchanger 22 and allowing the connection between the first check valve 26a and the second expansion valve 24b in the refrigerant flow passage 20c. The first solenoid valve 25a is provided in the refrigerant flow passage 20e. A refrigerant flow passage 20f is formed between the connection point of the refrigerant flow passage 20c to the refrigerant flow passage 20e and the second expansion valve 24b by allowing the connection between the input side of the first heat medium heat exchanger 23 into which the refrigerant flows and the refrigerant flow passage 20c. The third expansion valve 24c is provided in the refrigerant flow passage 20f. A refrigerant flow passage 20g is formed by connecting the output side of the first heat medium heat exchanger 23 from which the refrigerant is discharged to the refrigerant flow passage 20d between the second check valve 26b and the accumulator 27. A refrigerant flow passage 20h is formed between the outdoor heat exchanger 22 and the first check valve 26a in the refrigerant flow passage 20c by allowing the connection between the heat absorbing unit 14 and the second check valve 26b in the refrigerant flow passage 20d. The second solenoid valve 25b is provided in the refrigerant flow passage 20h.

The first heat medium circuit 30 includes: the first heat medium heat exchanger 23; a first heat medium pump 31 configured to pump the first heat medium; a second heat medium heat exchanger 32 as a second heat medium heat releasing unit configured to perform a heat exchange between the first heat medium flowing through the first heat medium circuit 30 and the second heat medium flowing through the second heat medium circuit 40; a heat medium heater 33 configured to heat the first heat medium flowing through the first heat medium circuit 30; a first heat medium three-way valve 34; and the battery B configured to accumulate electric power for driving the vehicle. These components are connected by, for example, an aluminum pipe or a copper pipe. As the first heat medium flowing through the first heat medium circuit 30, for example, antifreeze solution containing ethyleneglycol may be used.

To be more specific, the input side of the first heat medium heat exchanger 23 into which the first heat medium flows is connected to the delivery side of the first heat medium pump 31 from which the heat medium is discharged, thereby to form a heat medium flow passage 30a. The input side of the second heat medium heat exchanger 32 into which the first heat medium flows is connected to the output side of the first heat medium heat exchanger 23 from which the first heat medium is discharged, thereby to form a heat medium flow passage 30b. The input side of the first heat medium three-way valve 34 into which the heat medium flows is connected to the output side of the second heat medium heat exchanger 32 from which the first heat medium is discharged, thereby to form a heat medium flow passage 30c. The heat medium heater 33 is provided in the heat medium flow passage 30c. The input side of the battery B into which the heat medium flows is connected to one of two output ports of the first heat medium three-way valve 34, thereby to form a heat medium flow passage 30d. The suction side of the first heat medium pump 31 into which the heat medium is sucked is connected to the output side of the battery B from which the heat medium is discharged, thereby to form a heat medium flow passage 30e. In addition, the suction side of the first heat medium pump 31 into which the heat medium is sucked is connected to the other output port of the first heat medium three-way valve 34 from which the heat medium is discharged, bypassing the battery B, thereby to form a heat medium flow passage 30f as a bypass flow passage. The first heat medium three-way valve 34 switches the heat medium flow passage communicating with the heat medium flow passage 30c between the heat medium flow passage 30d and the heat medium flow passage 30e.

The second heat medium circuit 40 includes: the second heat medium heat exchanger 32; a second heat medium pump 41 configured to pump the second heat medium; a radiator 42 configured to perform a heat exchange between the second heat medium flowing through the second heat medium circuit 40 and the air outside the vehicle compartment; a second heat medium three-way valve 43; and the electric motor M for driving the vehicle. These components are connected by, for example, an aluminum pipe or a copper pipe. As the second heat medium flowing through the second heat medium circuit 40, for example, antifreeze solution containing ethyleneglycol may be used.

To be more specific, the input side of the electric motor M into which the heat medium flows is connected to the delivery side of the second heat medium pump 41 from which the heat medium is discharged, thereby to form a heat medium flow passage 40a. The input side of the second heat medium three-way valve 43 into which the heat medium flows is connected to the output side of the electric motor M from which the heat medium is discharged, thereby to form a heat medium flow passage 40b. The input side of the second heat medium heat exchanger 32 into which the second heat medium flows is connected to one of two output ports of the second heat medium three-way valve 43, thereby to form a heat medium flow passage 40c. The suction side of the second heat medium pump 41 into which the heat medium is sucked is connected to the output side of the second heat medium heat exchanger 32 from which the second heat medium is discharged, thereby to form a heat medium flow passage 40d. The input side of the radiator 42 into which the heat medium flows is connected to the other output port of the second heat medium three-way valve 43 from which the heat medium is discharged, thereby to form a heat medium flow passage 40e. The suction side of the second heat medium pump 41 into which the heat medium is sucked is connected to the output side of the radiator 42 from which the heat medium is discharged, thereby to form a heat medium flow passage 40*f*. The second heat medium three-way valve 43 switches the heat medium flow passage communicating with the heat medium flow passage 40*b* between the heat medium flow passage 40*c* and the heat medium flow passage 40*e*.

Each of the outdoor heat exchanger 22 and the radiator 42 is a heat exchanger constituted by fins and tubes, and disposed outside the vehicle compartment such as an engine room in the front-to-back direction of the vehicle which is the air flow direction. An outdoor fan 22*a* is provided near the outdoor heat exchanger 22 and the radiator 42, and configured to flow the air outside the vehicle compartment in the front-to back direction when the vehicle is stopped.

The vehicle air conditioning apparatus 1 with the above-described configuration adjusts the temperature and the humidity of the air in the vehicle compartment, by using the air conditioning unit 10 and the refrigerant circuit 20.

For example, during a cooling operation to reduce the temperature in the vehicle compartment, the indoor fan 12 is actuated and the degree of opening of the air mix damper 17 is set to 0% in the air conditioning unit 10. In addition, the compressor 21 is actuated while the first expansion valve 24*a* is fully open, the second expansion valve 24*b* is open at a predetermined degree, the third expansion valve 24*c* is fully closed, the first solenoid valve 25*a* is closed, and the second solenoid valve 25*b* is closed in the refrigerant circuit 20.

By this means, as indicated by solid arrows in FIG. 1, the refrigerant discharged from the compressor 21 flows through in the order of the refrigerant flow passage 20*a*, the heat releasing unit 15, the refrigerant flow passage 20*b*, the outdoor heat exchanger 22, the refrigerant flow passage 20*c*, the heat absorbing unit 14, and the refrigerant flow passage 20*d*, and is sucked into the compressor 21.

The refrigerant flowing through the refrigerant circuit 20 does not release the heat in the heat releasing unit 15 because the degree of opening of the air mix damper 17 is 0%, but releases the heat in the outdoor heat exchanger 22 and absorbs the heat in the heat absorbing unit 14.

The air flowing through the air flow passage 11 is subjected to a heat exchange with the refrigerant absorbing the heat in the heat absorbing unit 14, and therefore is cooled, and then blows to the vehicle compartment.

In addition, for example, during a cooling and dehumidifying operation to reduce the temperature and the humidity in the vehicle compartment, the degree of opening of the air mix damper 17 of the air conditioning unit 10 is set to a value greater than 0% in the flow path of the refrigerant in the refrigerant circuit 20 for the cooling operation.

By this means, the refrigerant flowing through the refrigerant circuit 20 releases the heat in the heat releasing unit 15 and the outdoor heat exchanger 22, and absorbs the heat in the heat absorbing unit 14.

The air flowing through the air flow passage 11 is dehumidified and cooled by the heat exchange with the refrigerant absorbing the heat in the heat absorbing unit 14, and heated to a target air-blowing temperature in the heat releasing unit 15, and then blows to the vehicle compartment.

Moreover, during a heating and dehumidifying operation to reduce the humidity and increase the temperature in the vehicle compartment, the degree of opening of the first expansion valve 24*a* is set to a predetermined value smaller than the full open in the flow path of the refrigerant in the refrigerant circuit 20 for the cooling operation. In addition, the degree of opening of the air mix damper 17 of the air conditioning unit 10 is set to a value greater than 0%.

By this means, the refrigerant flowing through the refrigerant circuit 20 releases the heat in the heat releasing unit 15, and absorbs the heat in the outdoor heat exchanger 22 and the heat absorbing unit 14.

The air flowing through the air flow passage 11 of the air conditioning unit 10 is dehumidified and cooled by the heat exchange with the refrigerant absorbing the heat in the heat absorbing unit 14, and heated to the target air-blowing temperature in the heat releasing unit 15, and then blows out.

Moreover, for example, in a heating operation to increase the temperature in the vehicle compartment, the outdoor fan 12 is actuated and the degree of opening of the air mix damper 17 is set to a value greater than 0% in the air conditioning unit 10. In addition, the compressor 21 is actuated while the first expansion valve 24*a* is open at a predetermined degree smaller than the full open, the second expansion valve 24*b* and the third expansion valve 24*c* are fully closed, the first solenoid valve 25*a* is closed, and the second solenoid valve 25*b* is open in the refrigerant circuit 20.

By this means, as indicated by dashed arrows in FIG. 1, the refrigerant discharged from the compressor 21 flows through in the order of the refrigerant flow passage 20*a*, the heat releasing unit 15, the refrigerant flow passage 20*b*, the outdoor heat exchanger 22, part of the refrigerant flow passage 20*c*, the refrigerant flow passage 20*h*, and part of the refrigerant flow passage 20*d*, and is sucked into the compressor 21.

The refrigerant flowing through the refrigerant circuit 20 releases the heat in the heat releasing unit 15, and absorbs the heat in the outdoor heat exchanger 22.

The air flowing through the air flow passage 11 of the air conditioning unit 10 is not subjected to a heat exchange with the refrigerant in the heat absorbing unit 14, but is subjected to a heat exchange with the refrigerant releasing the heat in the heat releasing unit 15, and therefore is heated, and then blows to the vehicle compartment.

When the vehicle is moved while the temperature and the humidity in the vehicle compartment is adjusted by using the air conditioning unit 10 and the refrigerant circuit 20, the heat is released from the electric motor M and the battery B. Therefore, the vehicle air conditioning apparatus 1 performs a battery cooling operation to cool the battery B as illustrated in FIG. 2, and a motor cooling operation to cool the electric motor M as illustrated in FIGS. 2 and 3.

For the battery cooling operation, the first heat medium pump 31 is actuated while the degree of opening of the third expansion valve 24*c* is set to a predetermined value in the refrigerant circuit 20, and the flow path of the first heat medium three-way valve 34 is set to communicate with the heat medium flow passage 30*d*.

Figure 2:
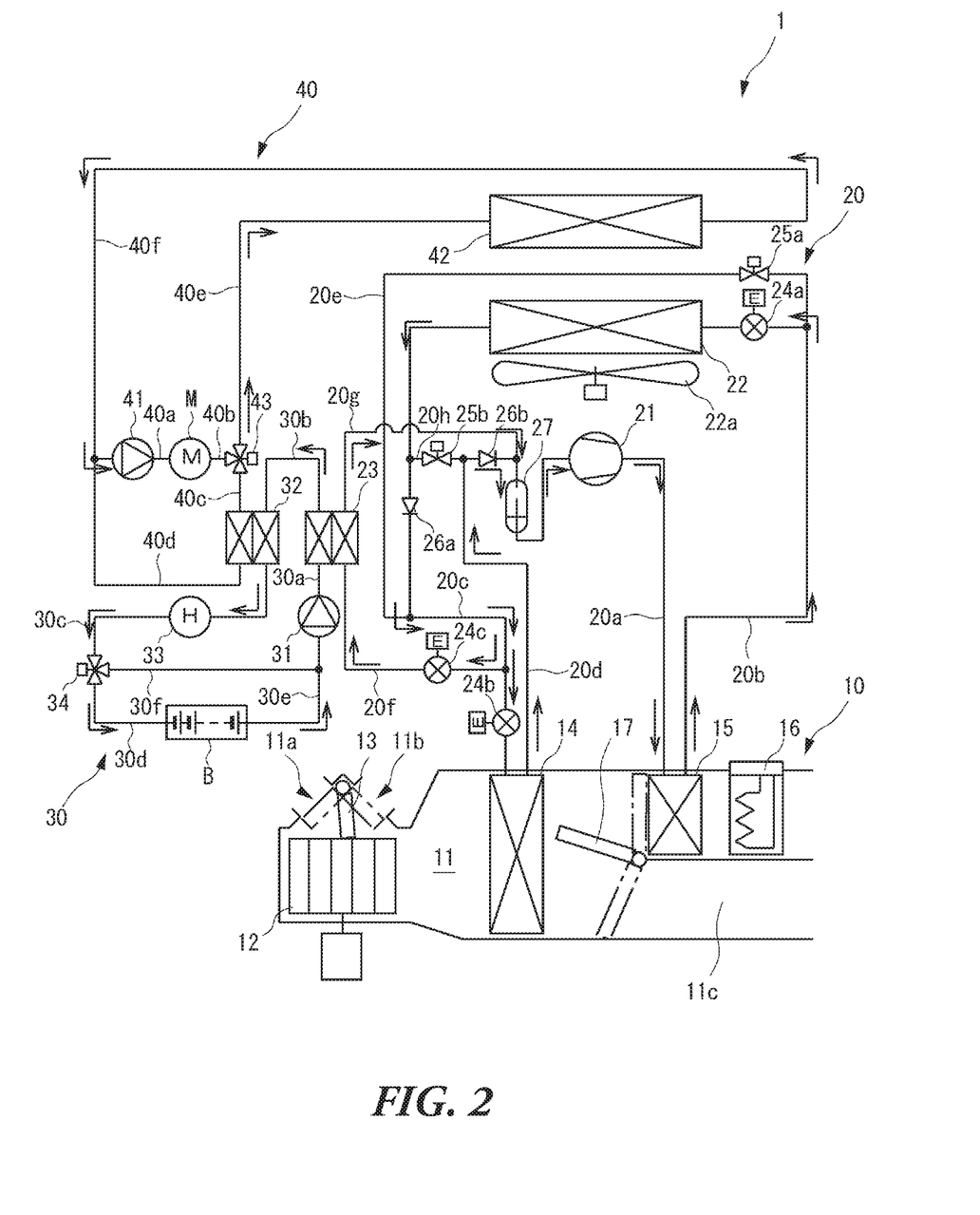
FIG. 2 schematically illustrates the configuration of the vehicle air conditioning apparatus during a battery cooling operation and a first motor cooling operation.
Figure 3:
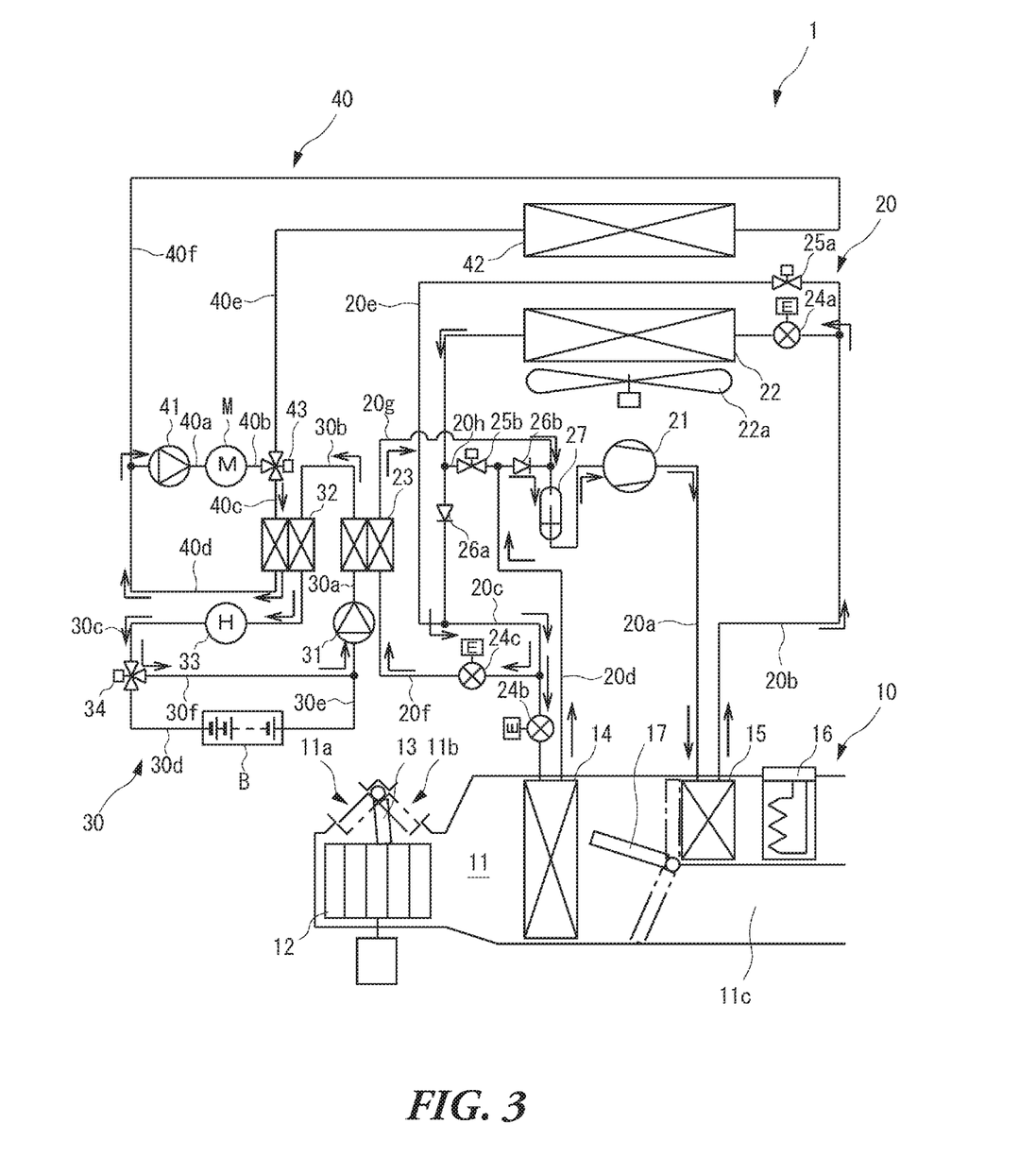
FIG. 3 schematically illustrates the configuration of the vehicle air conditioning apparatus during a second motor cooling operation.

As illustrated in FIG. 2, the refrigerant flowing through the refrigerant circuit 20 flows through the refrigerant flow passage 20*f* and flows into the first heat medium heat exchanger 23 to absorb the heat, flows through the refrigerant flow passage 20*g* and joins together the refrigerant flowing through the refrigerant flow passage 20*d*, and then is sucked into the compressor 21.

Meanwhile, the first heat medium flowing through the first heat medium circuit 30 is heated by the heat released from the battery B, and cooled by the heat exchange with the refrigerant absorbing the heat in the first heat medium heat exchanger 23.

The battery B is cooled by the first heat medium having been subjected to the heat exchange directly with the refrigerant.

The motor cooling operation includes a first motor cooling operation to release the heat released from the electric motor M to the air outside the vehicle compartment via the radiator 42 as illustrated of FIG. 2, and a second motor cooling operation to release the heat released from the electric motor M to the first heat medium flowing through the first heat medium circuit 30 via the second heat medium heat exchanger 32 as illustrated in FIG. 3.

For the first motor cooling operation, the second heat medium pump 41 is actuated while the flow path of the second heat medium three-way valve 43 is set to communicate with the heat medium flow passage 40e in the second heat medium circuit 40.

During the first motor cooling operation, the second heat medium flowing through the second heat medium circuit 40 is heated by the heat released from the electric motor M, and cooled by the heat exchange with the air outside the vehicle compartment in the radiator 42, as illustrated in FIG. 2.

The electric motor M is cooled by the second heat medium having been subjected to the heat exchange with the air outside the vehicle compartment via the radiator 42.

During the second motor cooling operation, the first heat medium pump 31 is actuated while the flow path of the first heat medium three-way valve 34 is set to communicate with the heat medium flow passage 30f in the first heat medium circuit 30. In addition, the second heat medium pump 41 is actuated while the flow path of the second heat medium three-way valve 43 is set to communicate with the heat medium flow passage 40c in the second heat medium circuit 40.

As illustrated in FIG. 3, during the second motor cooling operation, the first heat medium flowing through the first heat medium circuit 30 is cooled by the heat exchange with the refrigerant absorbing the heat in the first heat medium heat exchanger 23. Meanwhile, the second heat medium flowing through the second heat medium circuit 40 is heated by the heat released form the electric motor M, and cooled by the heat exchange with the first heat medium in the second heat medium heat exchanger 32.

The electric motor M is cooled by the second heat medium having been subjected to the heat exchange indirectly with the refrigerant via the first heat medium, and therefore kept at a temperature higher than that of the battery B cooled by the first heat medium having been subjected to the heat exchange directly with the refrigerant.

In this case, when the first heat medium is subjected to the heat exchange with the second heat medium flowing through the second heat medium circuit 40 in the second heat medium heat exchanger 32, the first heat medium flows through the first heat medium circuit 30, bypassing the battery B. Therefore, the heat released from the electric motor M does not affect the battery B.

Figure 4:
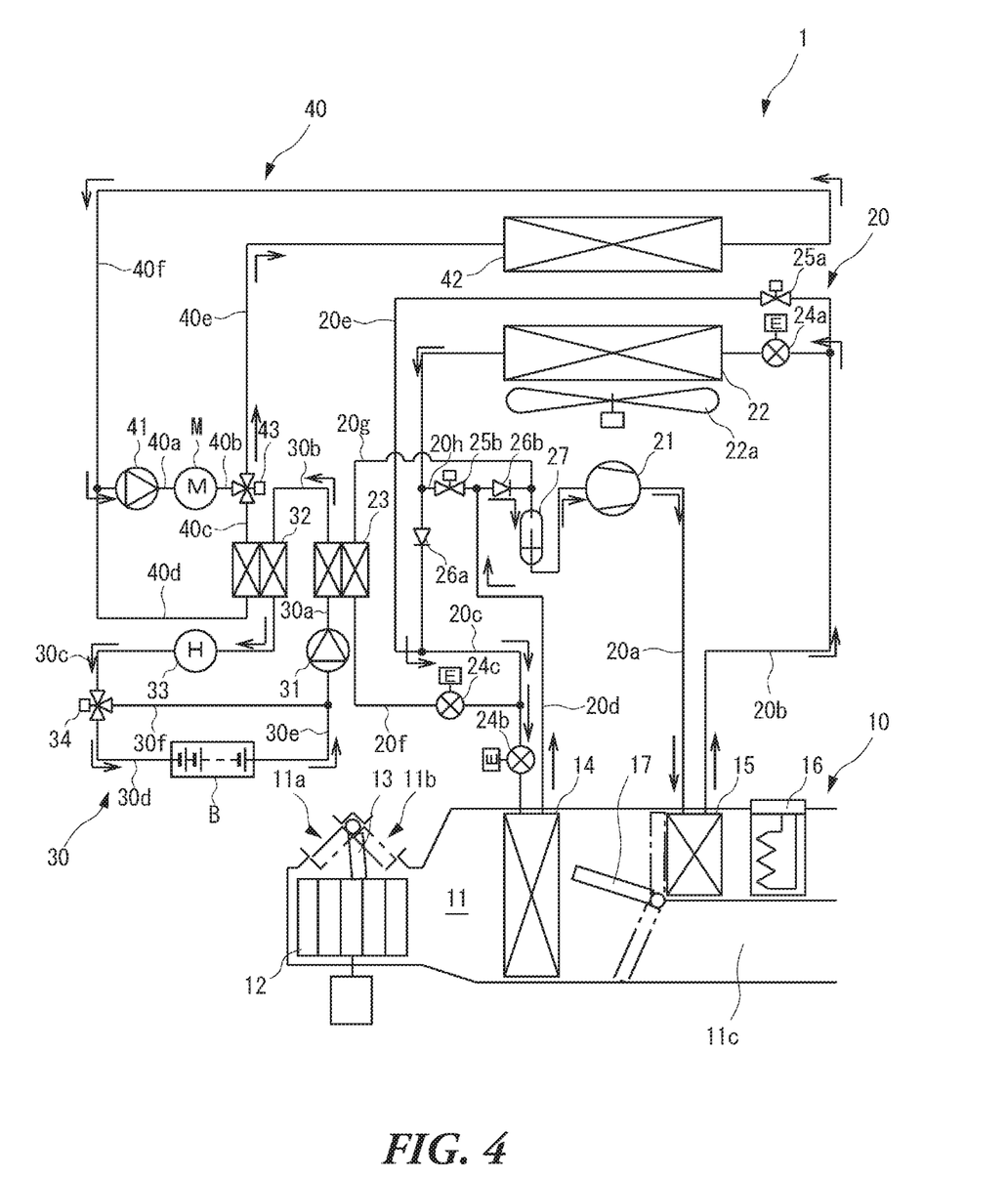
FIG. 4 schematically illustrates the configuration of the vehicle air conditioning apparatus during a battery heating operation.

In addition, when there is need to cool the electric motor M and heat the battery B while the temperature and the humidity in the vehicle compartment is adjusted by using the air conditioning unit 10 and the refrigerant circuit 20, the electric motor M is cooled by the first motor cooling operation, and a battery heating operation to heat the battery B is performed.

For the battery heating operation, the degree of opening of the third expansion valve 24c is set to the full close in the refrigerant circuit 20; the flow path of the first heat medium three-way valve 34 is set to communicate with the heat medium flow passage 30d; the first heat medium pump 31 is actuated; and the heat medium heater 33 is actuated.

As illustrated in FIG. 4, the refrigerant flowing through the refrigerant circuit 20 is restricted from flowing into the first heat medium heat exchanger 23. Meanwhile, the first heat medium flowing through the first heat medium circuit 30 is heated by the heat medium heater 33. The battery B is heated by the first heat medium heated by the heat medium heater 33.

Figure 5:
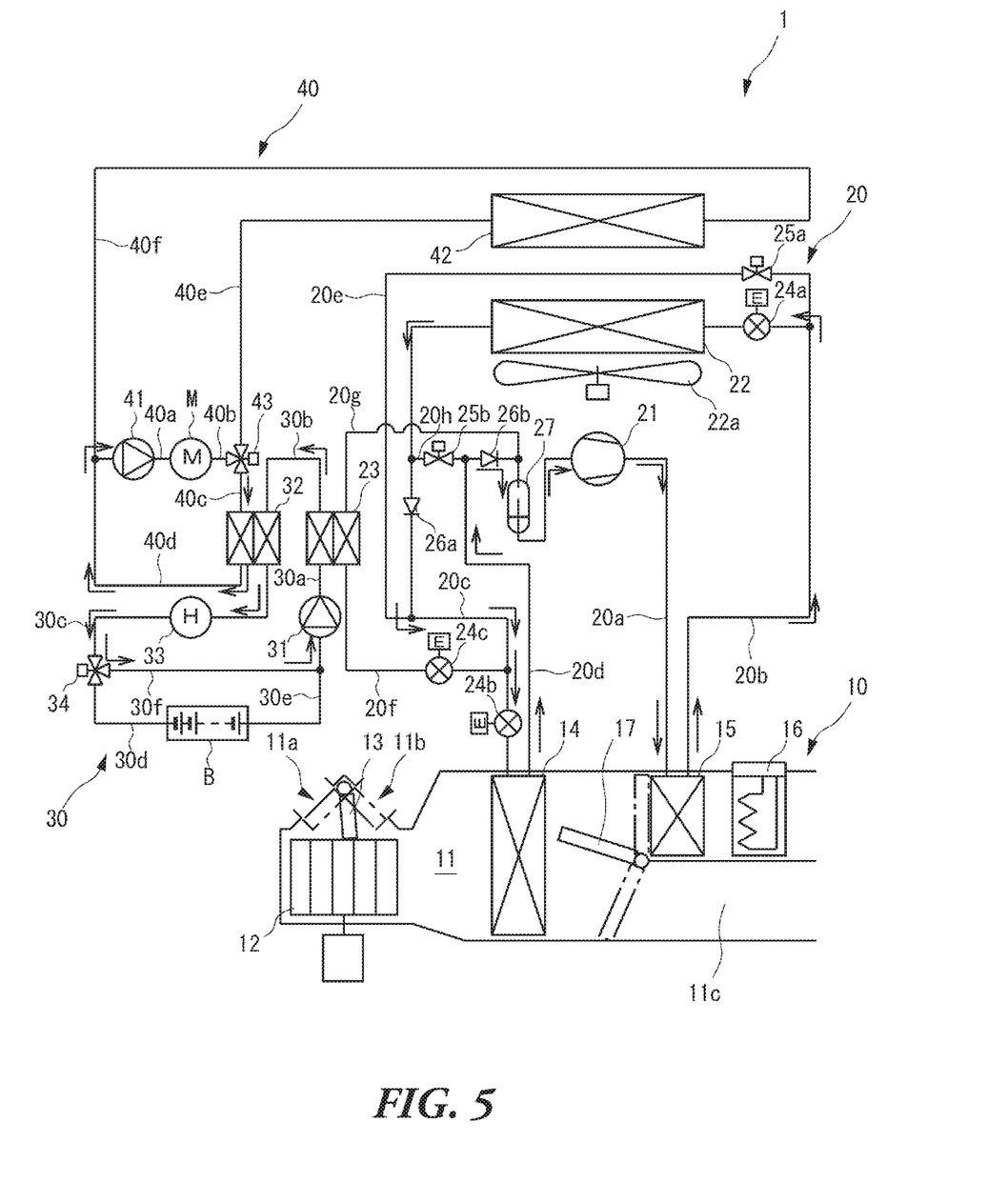
FIG. 5 schematically illustrates the configuration of the vehicle air conditioning apparatus during a motor heating operation.

In addition, when there is no need to cool or heat the battery B, but there is need to heat the electric motor M while the temperature and the humidity in the vehicle compartment is adjusted by using the air conditioning unit 10 and the refrigerant circuit 20, a motor heating operation is performed.

For the motor heating operation, the degree of opening of the third expansion valve 24c is set to the full close in the refrigerant circuit 20. In addition, in the first heat medium circuit 30, the flow path of the first heat medium three-way valve 34 is set to communicate with the heat medium flow passage 30f; the first heat medium pump 31 is actuated; and the heat medium heater 33 is actuated. Moreover, in the second heat medium circuit 40, the flow path of the second heat medium three-way valve 43 is set to communicate with the heat medium flow passage 40c, and the second heat medium pump 41 is actuated.

As illustrated in FIG. 5, the refrigerant flowing through the refrigerant circuit 20 is restricted from flowing into the first heat medium heat exchanger 23. In addition, the first heat medium flowing through the first heat medium circuit 30 does not release the heat to the battery B, and is heated by the heat medium heater 33. Moreover, the second heat medium flowing through the second heat medium circuit 40 is heated by the heat exchange with the first heat medium heated by the heat medium heater 33 in the second heat medium heat exchanger 32. The electric motor M is heated by the second heat medium heated by the heat exchange with the first heat medium.

When the amount of the heat absorbed into the refrigerant is insufficient while the heating operation or the heating and dehumidifying operation for the vehicle compartment is performed by using the air conditioning unit 10 and the refrigerant circuit 20, it is possible to utilize the heat released from one or both of the first heat medium circuit 30 and the second heat medium circuit 40 as the heat to be absorbed into the refrigerant.

With the above-described embodiment, the vehicle air conditioning apparatus 1 includes: the refrigerant circuit 20 configured to adjust the temperature or the humidity of the air in the vehicle compartment by performing a heat exchange between the air to be supplied to the vehicle compartment and the refrigerant; the first heat medium circuit 30 configured to allow the first heat medium absorbing the heat released from the battery B to flow therethrough; the second heat medium circuit 40 configured to allow the second heat medium absorbing the heat released from the electric motor M to flow therethrough; the first heat medium heat exchanger 23 configured to perform a heat exchange between the refrigerant flowing through the refrigerant circuit 20 and the first heat medium flowing through the first heat medium circuit 30 to release the heat from the first heat medium to the refrigerant; and the second heat medium heat exchanger 32 configured to perform a heat exchange between the first heat medium flowing through the first heat medium circuit 30 and the second heat medium flowing through the second heat medium circuit 40 to release the heat from the second heat medium to the first heat medium.

By this means, it is possible to keep the temperature of the electric motor M cooled by the second heat medium having been subjected to the heat exchange indirectly with the refrigerant via the first heat medium higher than the temperature of the battery B cooled by the first heat medium having been subjected to the heat exchange directly with the refrigerant. Therefore, when the battery B and the electric motor M have target cooling temperatures different from one another, it is possible to easily make the temperatures of the battery B and the electric motor M reach the respective target cooling temperatures without complicated controls.

In addition, the first heat medium circuit 30 includes the heat medium flow passage 30f configured to circulate the first heat medium, bypassing the battery B.

By this means, when the electric motor M connected to the second heat medium circuit 40 is cooled by the refrigerant flowing through the refrigerant circuit 20 via the first heat medium circuit 30, or is heated by the first heat medium heated by the heat medium heater 33, it is possible to prevent the heat of the electric motor M from affecting the battery B, or prevent the heat of the battery B from affecting the electric motor M.

Moreover, the first heat medium circuit 30 includes the heat medium heater 33 configured to heat the first heat medium flowing through the first heat medium circuit 30.

By this means, it is possible to heat the first heat medium flowing through the first heat medium circuit 30. Therefore, when there is need to heat the battery B and the electric motor M, for example, when the vehicle starts to be driven under a low temperature condition, it is possible to heat the battery B and the electric motor M by the heated first heat medium. Moreover, when the amount of the heat absorbed from the outdoor heat exchanger 22 is in sufficient in the refrigerant circuit 20 during the heating operation, it is possible to absorb the heat of the first heat medium into the refrigerant flowing through the refrigerant circuit 20 via the first heat medium heat exchanger 23.

Furthermore, the second heat medium circuit 40 includes the heat medium flow passages 40e and 40f configured to circulate the second heat medium, bypassing the second heat medium heat exchanger 32, and the radiator 42 configured to perform a heat exchange between the second heat medium flowing through the heat medium flow passages 40e and 40f and the air outside the vehicle compartment.

By this means, it is possible to release the heat from the second heat medium to the air outside the vehicle compartment, and therefore to cool the electric motor M without using the refrigerant circuit 20 and the first heat medium circuit 30.

Furthermore, the battery B configured to supply the electric power for driving the vehicle is connected to the first heat medium circuit 30, and the electric motor M for driving the vehicle is connected to the second heat medium circuit 40.

By this means, in the vehicle such as an electric car, it is possible to cool the battery B and the electric motor M having available temperature zones different from one another at different temperatures.

Here, with the above-described embodiment, the battery B as the first heat releasing body and the electric motor M as the second heat releasing body have been illustrated as the targets to be cooled, but this is by no means limiting. For example, an electric power unit or an electronic component such as a converter as a component of the vehicle may be used as the first heat releasing body, and the electric motor M may be used as the second heat releasing body, as long as the target cooling temperature of the second heat releasing body is higher than the target cooling temperature of the first heat releasing body.

In addition, with the above-described embodiment, the first heat medium heat exchanger 23 configured to release the heat from the first heat medium to the refrigerant, and the second heat medium heat exchanger 32 configured to release the heat from the second heat medium to the first heat medium have been illustrated as separate components. However, this is by no means limiting. One heat medium heat exchanger having the function of the first heat medium heat exchanger 23 and the function of the second heat medium heat exchanger 32 may be used.

Moreover, with the above-described embodiment, the second heat medium circuit 40 includes the heat medium flow passages 40e and 40f configured to circulate the second heat medium, bypassing the second heat medium heat exchanger 32, and the radiator 42 configured to perform a heat exchange between the air outside the vehicle compartment and the second heat medium flowing through the heat medium flow passages 40e and 40f. Like the second heat medium circuit 40, the first heat medium circuit 30 may include a bypass flow passage configured to circulate the heat medium, bypassing the first heat medium heat exchanger 23 and the second heat medium heat exchanger 32, and a radiator configured to perform a heat exchange between the air outside the vehicle compartment and the first heat medium flowing through the bypass flow passage.

Furthermore, with the above-described embodiment, antifreeze solution is used as the first heat medium flowing through the first heat medium circuit 30 and as the second heat medium flowing through the second heat medium circuit 40. However, this is by no means limiting. For example, water and oil may be used as the first heat medium and the second heat medium, as long as it is possible to perform a heat exchange between the refrigerant and the first heat medium, and between the first heat medium and the second heat medium.

REFERENCE SIGNS LIST 14 heat absorbing unit
15 heat releasing unit
20 refrigerant circuit
21 compressor
22 outdoor heat exchanger
23 first heat medium heat exchanger
30 first heat medium circuit
30f heat medium flow passage
32 second heat medium heat exchanger
33 heat medium heater
40 second heat medium circuit
42 radiator
B battery
M electric motor

The invention claimed is:

1. A vehicle air conditioning apparatus comprising:
a refrigerant circuit configured to adjust a temperature or a humidity of air in a vehicle compartment,
the refrigerant circuit including a compressor, indoor heat exchangers configured to perform a heat exchange between air supplied to the vehicle compartment and a refrigerant, an outdoor heat exchanger, and expansion valves;
a first heat medium circuit configured to allow a first heat medium absorbing heat released from a first heat releasing body to flow therethrough;

a second heat medium circuit configured to allow a second heat medium absorbing heat released from a second heat releasing body to flow therethrough;

a first heat medium heat releasing unit configured to perform a heat exchange between the refrigerant flowing through the refrigerant circuit and the first heat medium flowing through the first heat medium circuit to release the heat from the first heat medium to the refrigerant; and a second heat medium heat releasing unit configured to perform a heat exchange between the first heat medium flowing through the first heat medium circuit and the second heat medium flowing through the second heat medium circuit to release the heat from the second heat medium to the first heat medium.

2. The vehicle air conditioning apparatus according to claim 1, wherein the first heat medium circuit includes a bypass flow passage configured to circulate the first heat medium, bypassing the first heat releasing body.

3. The vehicle air conditioning apparatus according to claim 2, wherein the first heat medium circuit includes a heater configured to heat the first heat medium.

4. The vehicle air conditioning apparatus according to claim 3, wherein:
the first heat releasing body is a battery configured to supply electric power for driving the vehicle; and
the second heat releasing body is an electric motor for driving the vehicle.

5. The vehicle air conditioning apparatus according to claim 2, wherein the second heat medium circuit includes:
bypass flow passages configured to circulate the second heat medium, bypassing the second heat medium heat releasing unit; and
a radiator configured to perform a heat exchange between the second heat medium flowing through the bypass flow passages and air outside the vehicle compartment.

6. The vehicle air conditioning apparatus according to claim 2, wherein:
the first heat releasing body is a battery configured to supply electric power for driving the vehicle; and
the second heat releasing body is an electric motor for driving the vehicle.

7. The vehicle air conditioning apparatus according to claim 1, wherein the first heat medium circuit includes a heater configured to heat the first heat medium.

8. The vehicle air conditioning apparatus according to claim 7, wherein the second heat medium circuit includes:
bypass flow passages configured to circulate the second heat medium, bypassing the second heat medium heat releasing unit; and
a radiator configured to perform a heat exchange between the second heat medium flowing through the bypass flow passages and air outside the vehicle compartment.

9. The vehicle air conditioning apparatus according to claim 7, wherein:
the first heat releasing body is a battery configured to supply electric power for driving the vehicle; and
the second heat releasing body is an electric motor for driving the vehicle.

10. The vehicle air conditioning apparatus according to claim 1, wherein the second heat medium circuit includes:
bypass flow passages configured to circulate the second heat medium, bypassing the second heat medium heat releasing unit; and
a radiator configured to perform a heat exchange between the second heat medium flowing through the bypass flow passages and air outside the vehicle compartment.

11. The vehicle air conditioning apparatus according to claim 1, wherein:
the first heat releasing body is a battery configured to supply electric power for driving the vehicle; and
the second heat releasing body is an electric motor for driving the vehicle.

\* \* \* \* \*